E. P. CAYO.
COTTON HARVESTER.
APPLICATION FILED OCT. 20, 1915.
1,213,151.
Patented Jan. 23, 1917.
5 SHEETS—SHEET 4.
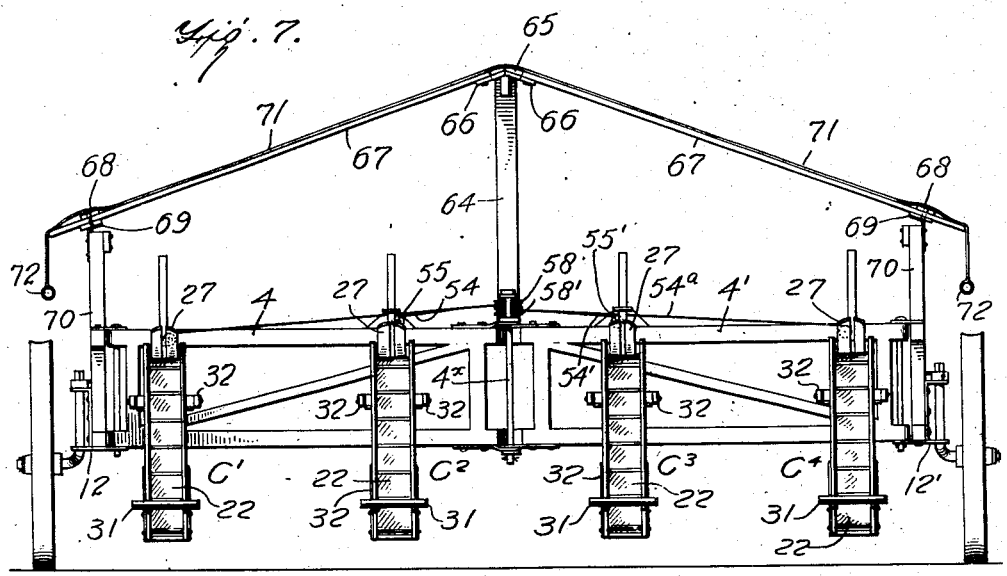
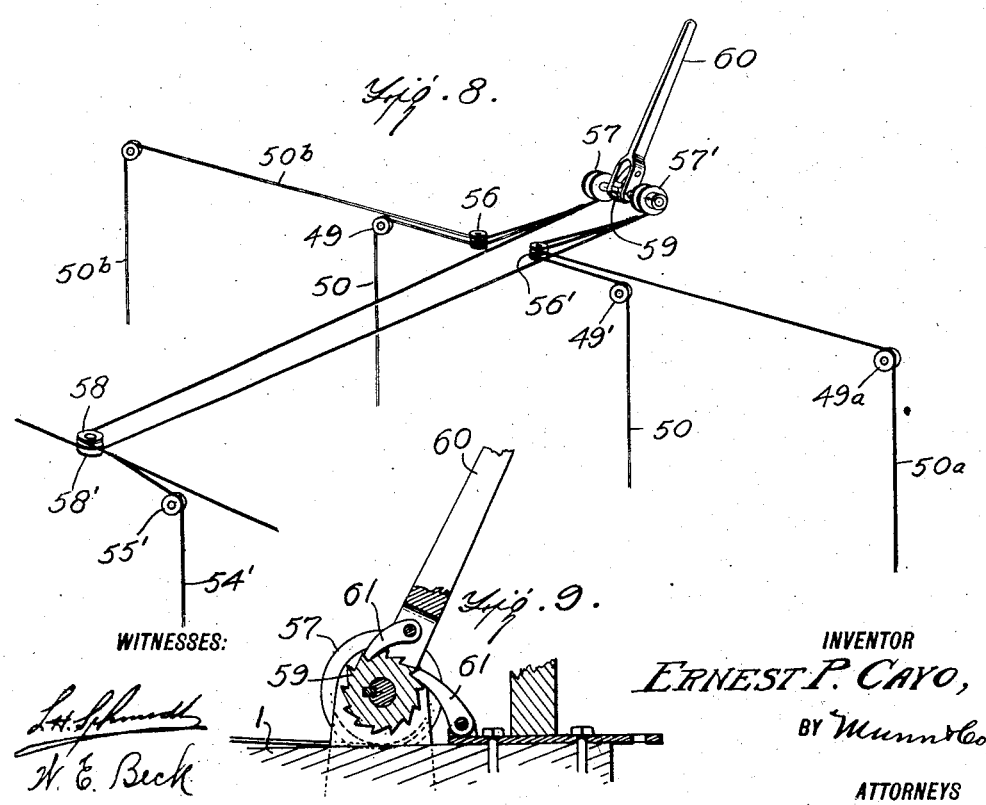
WITNESSES:
INVENTOR
ERNEST P. CAYO,
BY Munn & Co.
ATTORNEYS

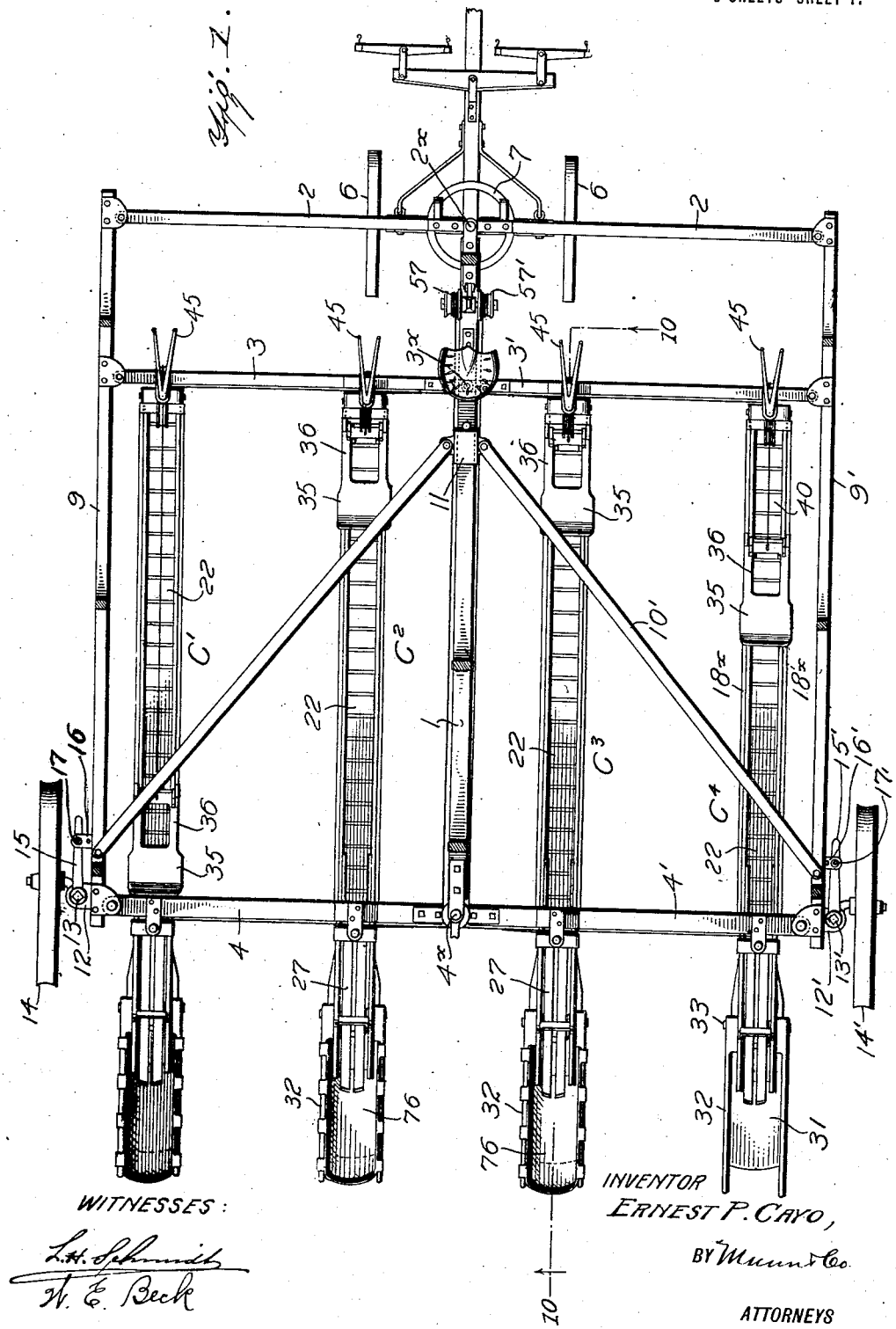

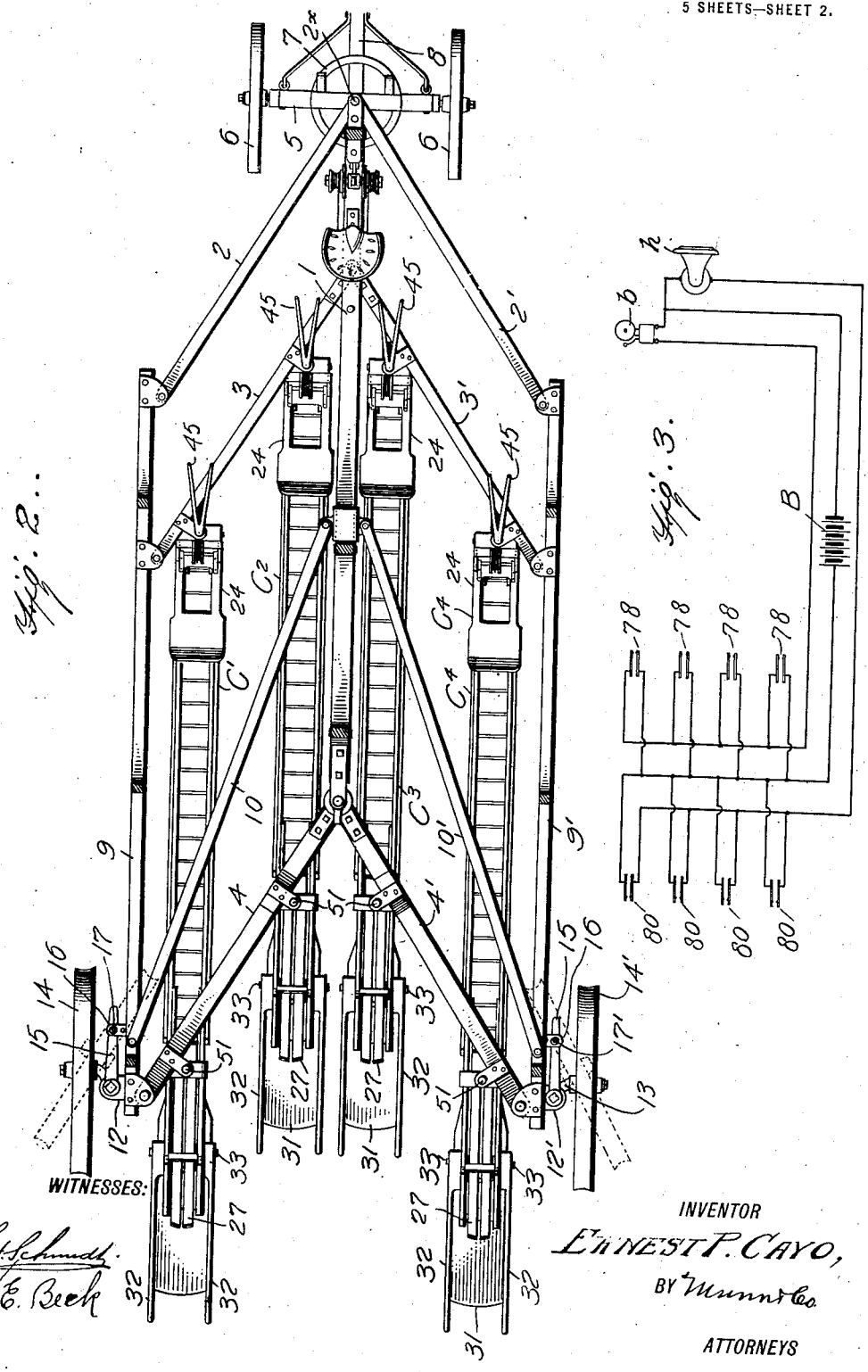

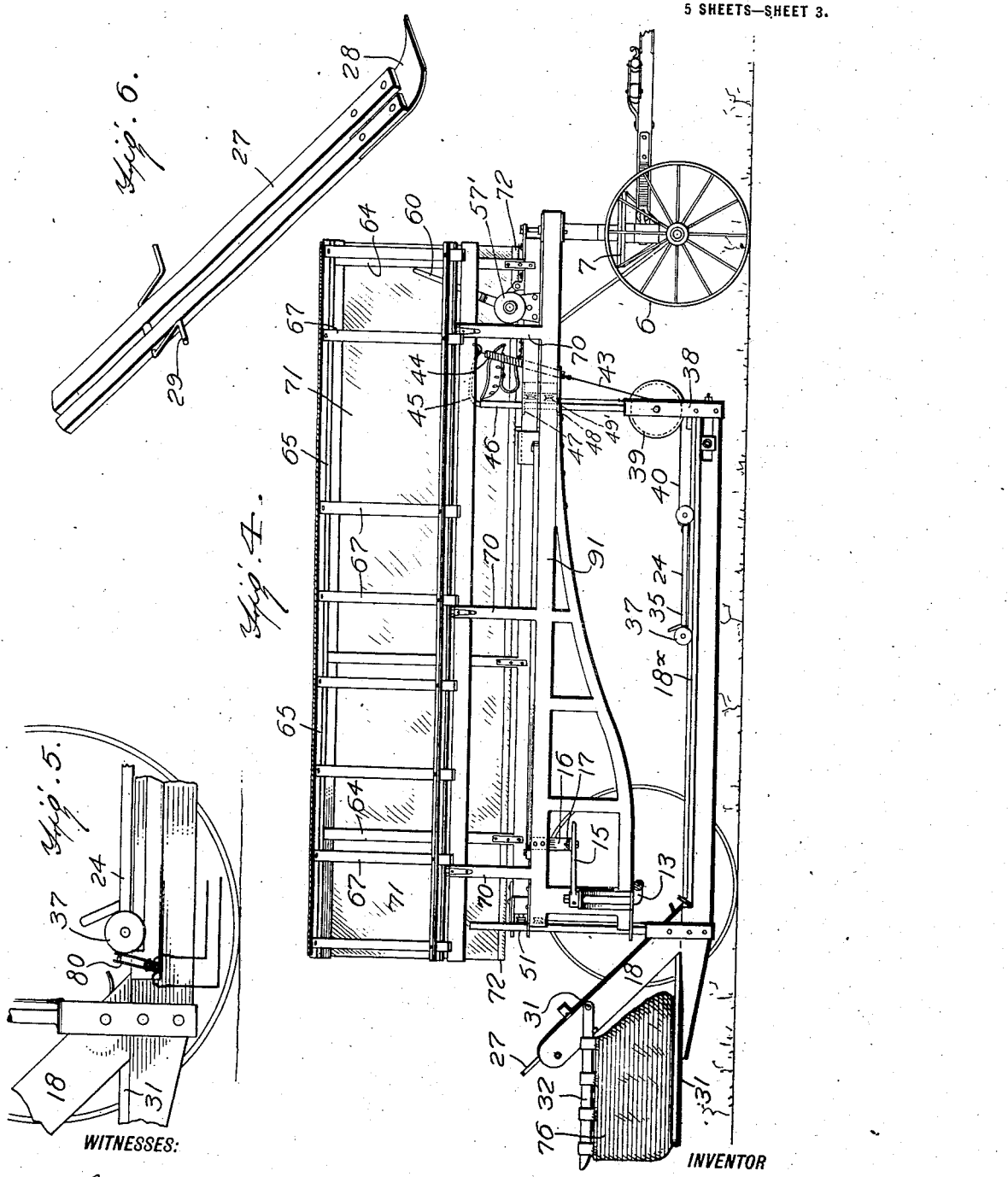

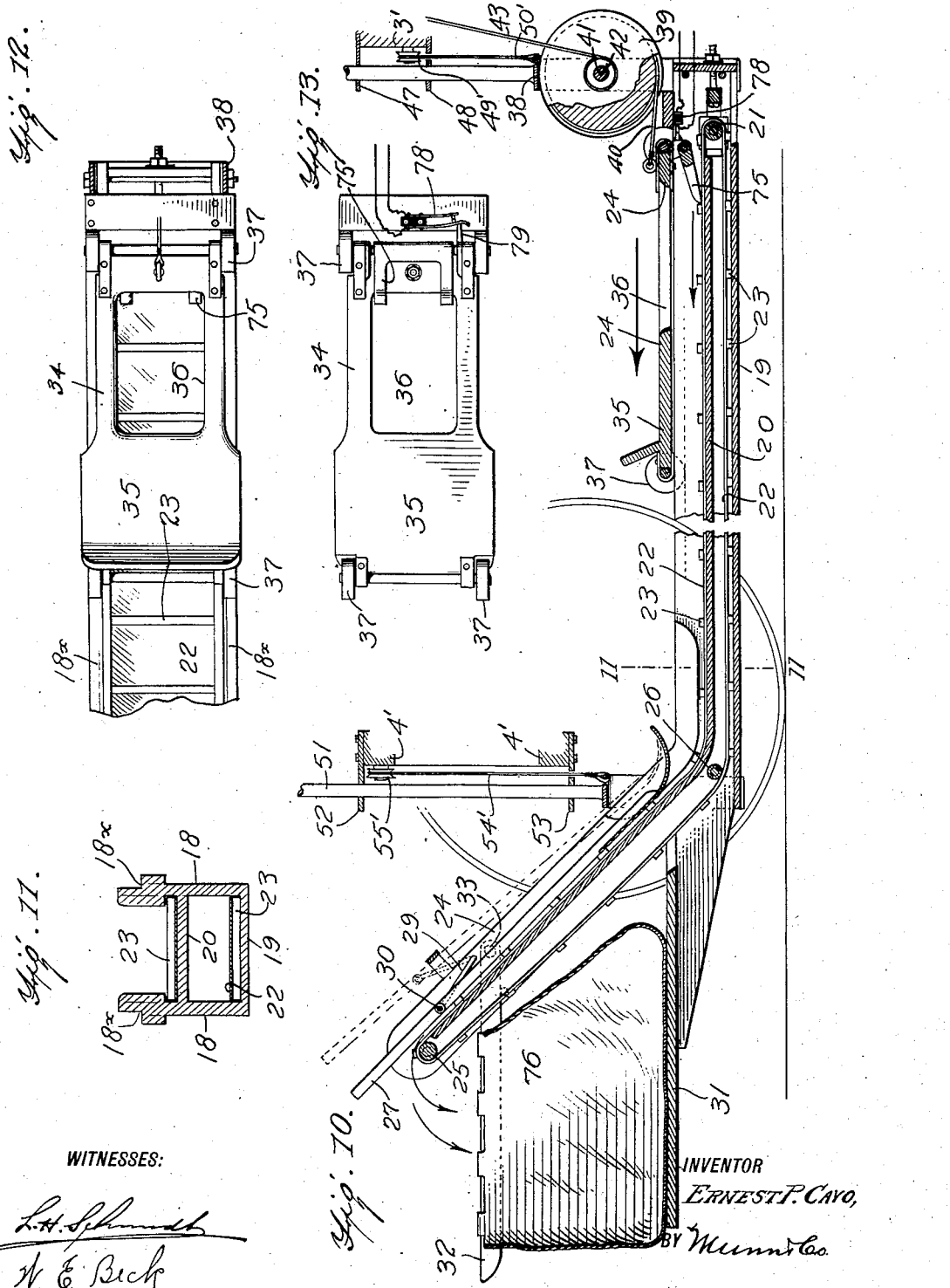

UNITED STATES PATENT OFFICE.

ERNEST PATRICK CAYO, OF BEEVILLE, TEXAS.

COTTON-HARVESTER.

1,213,151.    Specification of Letters Patent.    Patented Jan. 23, 1917.

Application filed October 20, 1915. Serial No. 56,900.

*To all whom it may concern:*

Be it known that I, ERNEST P. CAYO, a citizen of the United States, and a resident of Beeville, in the county of Bee and State of Texas, have invented a certain new and useful Improvement in Cotton-Harvesters, of which the following is a specification.

My invention relates to improvements in cotton harvesters, and it consists in the combinations, constructions, and arrangements herein described and claimed.

An object of my invention is to provide a device which may aid the hand-picking of cotton, so that the picker is enabled to do the picking with more comfort, with greater facility, and with less fatigue.

A further object of my invention is to provide a device for delivering cotton which has been picked, to a receptacle or sack which is carried by the machine, without the necessity of the pickers going to and from the sack.

A further object of my invention is to provide a device for aiding in the picking of cotton which permits the picker to be seated during the picking operation, but which permits him to move back and forth along the row, within the limits of the machine, at will.

A further object of my invention is to provide a device of the type described which may be folded or extended, and when folded, is designed to occupy less space, thereby permitting the device to be more readily transported and easier to turn.

Other objects and advantages will appear in the following specification, and the novel features of the invention will be particularly pointed out in the appended claims.

My invention is illustrated in the accompanying drawings forming part of this application, in which—

Figure 1 is a plan view of the device when extended, the awning being removed. Fig. 2 is a plan view of the device when collapsed or folded, the awning being removed. Fig. 3 is a diagrammatic view of an electric circuit. Fig. 4 is a side view of the device, a portion of the awning being removed for sake of clearness. Fig. 5 is a detail view showing the electric contacts for sounding a horn. Fig. 6 is a perspective view of a guard member. Fig. 7 is a rear view of the device extended. Fig. 8 is a diagrammatic view showing the arrangement of cables for lifting the conveyers. Fig. 9 is a sectional view through a portion of the pawl and ratchet mechanism for operating the cable shown in Fig. 8. Fig. 10 is a section along the line 10—10 of Fig. 1. Fig. 11 is a section along the line 11—11 of Fig. 10. Fig. 12 is a detail plan view of one of the slidable seats. Fig. 13 is a bottom plan view of one of the seats.

In carrying out my invention I provide a foldable frame. This frame is composed of a central longitudinal beam 1. Pivotally connected to the beam 1 are laterally extending arms 2, 2', 3, 3', and 4, 4'. The arms 2, 2' are connected to the beam 1 at $2^x$, 3, 3' at $3^x$, and 4, 4' at $4^x$. As will be seen from Fig. 7, the arms 4, 4' are really frames, these frames being secured to the beam 1 by the common pintle $4^x$. The arms 2, 2' are likewise frames and the king bolt $2^x$, as will be seen from Fig. 4, serves the double purpose of pivotally securing these laterally extending arms and at the same time pivotally securing the front truck to the beam 1. This truck consists of the axle 5, the wheels 6, the fifth wheel 7, and the necessary brace members and connecting members, etc., which are common in this construction and which form no part of my present invention except in so far as they provide an efficient means for turning the front wheels, so as to guide the vehicle.

As will be seen from Figs. 1 and 2, the ends of the arms 2, 3, 4, are connected by side members 9, while a similar side member 9' connects the ends of the members 2', 3', and 4'. Since the connections of the laterally extending members with the side members are pivotal, this permits the parts to be folded in the manner shown in Fig. 2. It will be observed that there are brace members 10 and 10' which are pivotally connected at their rear ends to the side members 9 and 9' respectively, and which are pivotally connected at their front ends to a common slidable guide 11 which slides on the central beam 1.

The rear wheels of the device are carried by brackets 12 and 12', these brackets supporting the steering knuckles 13 and 13' upon which the wheels 14 and 14' are carried. Secured to the steering knuckle 13 is an arm 15 which may be connected to a bracket 16 by means of a pin 17 so as to hold the wheel 14 in fixed position during the normal operation of the machine. Similarly the members 15', 16', and 17' serve to hold the wheels 14' in position parallel to the wheels 14.

Suspended from the frame formed by the members 1, 3, 3', 4, 4', 9 and 9', is a series of conveyers. All of these conveyers are similar, and a description of one will suffice for all. As will be seen from Fig. 11, each conveyer consists of sides 18, a bottom 19, and a false bottom 20 which runs longitudinally of the conveyer. At the front end of each of the conveyers is a roller 21 over which an endless belt 22 of canvas or the like runs. Cleats 23 are provided as shown in Fig. 10. At the rear end of the conveyer is an inclined portion 24 at whose upper end is a roller 25 over which the endless belt 22 passes, a guide roller being provided at 26 at the junction of the main body portion of the conveyer with the inclined portion. The purpose of this conveyer is to pass the cotton which may be picked and placed therein, rearwardly and up the inclined portion, and in order to prevent the cotton from spilling out of the inclined portion or blowing out, I arrange in the inclined portion a guard like that shown in Fig. 6. This consists preferably of strips 27 which are provided at their ends with a common plate 28 which is curved upwardly as shown in the drawings. The strips 27 are mounted to swing on U-shaped supports 29 which are pivoted at 30 in the side walls of the upwardly inclined portion 24, the guard being arranged to raise and lower of its own weight as the cotton passes underneath it.

Projecting rearwardly from each of the conveyers is a platform such as that shown at 31 in Fig. 10. This platform is for the support of the bag which is being filled by the conveyer. The upper part of the bag is held open by means of spaced arms 32 which are secured at 33 to the sides of the conveyer.

At the top of the side members of the conveyer are track portions $18^x$, on which is mounted a carriage 34. This carriage is provided with a seat portion 35 in front of which is an opening 36. A back 37 may be provided and this back may be of any suitable shape. The carriage is preferably mounted on wheels 37 so as to run on the tracks $18^x$. Journaled between uprights 38 carried by the sides of the conveyer is a wheel or drum 39 around which is wound a cable 40. One end of this cable is attached to the forward part of the carriage 24. The wheel 39 is journaled at 41 and is provided on each side with a hub portion 42. Cables 43 are wound around the hub portions and extend upwardly, being attached to springs 44 secured to laterally extending arms 45 carried by the upright 46 secured to the brackets 38. It will be seen that as the car is pushed rearwardly on the track, the drum or wheel 39 will be rotated so as to pay off the cable 40, at the same time the cables 43 are wound up, thereby tightening the springs 44. When the car is moved forwardly, the cable is rewound on the drum 39, the springs 44 assisting in the forward movement of the car.

It will be seen from Figs. 4 and 10 that the vertically extending rod or upright 46 serves a double purpose. This rod passes through upper and lower guide members 47 and 48 respectively, carried by one of the laterally extending arms, such for instance as that shown at 3'. The latter bears a pulley over which a cable 50' runs. The end of the cable is attached to the upright 38. The rod 46 slides freely in the guide members 47 and 48, so that when the cable 50' is wound up, the conveyer will be lifted.

In order to facilitate the lifting of the conveyer, a sliding rod 51 is provided at the rear end of each conveyer at substantially the junction of the main body portion of the conveyer with the inclined portion. This rod passes through guide members 52 and 53 on the laterally extending arms, such as those shown at 4 and 4'. A cable 54 passes over a pulley 55 carried by the frame. It will be seen that the cables 50' at one end and 54' at the other end, suspend the conveyer shown in Fig. 10, while the members 46 and 51 serve as guide members for the raising and lowering of the conveyer. Referring now to Fig. 8, it will be seen that the cable 50' passes over a pulley 56' and then around a drum 57', while the cable 54' passes around the pulley 58 and thence over a drum or reel 57. The drums 57 and 57' are on the same shaft with a ratchet 59, see Fig. 9. A lever 60 is provided with a pawl 61 arranged to engage the ratchet in its movement in one direction, and to slide over the teeth in its movement in the opposite direction. A locking dog 61 holds the ratchet wheel 59 in its shifted position.

In the drawings I have shown four of these conveyers, which I have denoted in general by $C'$, $C^2$, $C^3$, and $C^4$. On reference to Fig. 8, it will be seen that the cables $50^a$ and $54^a$ which pass over the pulleys $49^a$ and $55^a$ respectively are in a position to suspend the conveyer $C^3$. On the opposite side of the center of the machine are the cables 50 and $50^b$ which are designed to connect with the front ends of the conveyers $C^2$ and $C'$ respectively, these cables passing around the pulleys 56 and on to the drum 57. The rear ends of the conveyers $C^2$ and $C'$ are supported in a manner similar to that shown in Fig. 8, in connection with the conveyers $C^3$ and $C^4$.

In order to protect the pickers from the sun, I arrange a frame consisting of uprights 64 disposed on the main beam 1 and supporting at their tops a ridge pole 65. Pivotally connected to the ridge pole at 66, see Fig. 7, are laterally extending frame members 67 which have pivotal connections 68 to two longitudinally extending strips 69 secured at the top of uprights 70 carried by the side members 9 and 9' of the frame.

Over the top of the auxiliary frame formed by the ridge pole 65, the laterally extending member 67 and the longitudinal members 69, I arrange a canvas covering 71 which is held in place by rods 72 run through loops in the edges of the sheet. These rods 72 form the means by which the canvas may be rolled back toward the ridge pole so as to uncover the top of the machine if desired.

From the foregoing description of the various parts of the device, the operation thereof may be readily understood.

The machine is designed to be drawn by animals, but it will be obvious that it might be propelled by a motor without departing from the spirit of the invention. In the position shown in Fig. 1, in which the frame is extended, the conveyers $C'$, $C^2$, $C^3$, and $C^4$ are designed to be spaced apart so as to enter between the rows of cotton. The pickers take their seats on the sliding carriages where they are in a position to pick the cotton from the rows on either side. As the cotton is picked, it is dropped into the openings 36 in the carriage and falls into the trough of the conveyer. The picker may move his seat along the track $18^x$ forwardly or backwardly or by bracing his feet on the ground, he can cause a relative backward movement of the carriage 24 when the machine as a whole is moved forwardly. In other words, he can hold the carriage in its position while the machine is drawn forwardly so as to shift the position of the carriage from the front to the rear. In either of these movements the conveyer belt 22 is moved rearwardly by the engagement of a pivoted pawl 75 with the cleats 23 which are carried by the endless belt. This belt as stated before and as clearly shown in Fig. 10, passes around a roller 25 so that any cotton which is deposited on the top of the endless belt will eventually be deposited into the bag 76 at the rear of the device. In order to aid the movement of the carriage from the rear to the front end of the device, I make use of a drum 39 as already described. It will be apparent that as the carriage moves from the front to the rear, the cable 40 will be unwound from the drum while the cable 43 will be wound on the hub portion 42, thereby increasing tension on the springs, such as that shown at 44 in Fig. 5, and thus putting the drum 39 under tension.

At the front end of each of the conveyers is disposed a pair of contacts such as those shown at 78 in Fig. 13, which are arranged to be closed by an abutting portion of the carriage, such as the arm 79, when the carriage is in forward position. The closing of any one of the contacts 78 causes the ringing of a bell $b$ which is in circuit with a battery B, as shown in Fig. 3. At the rear end of each conveyer is a pair of contacts 80 which are closed by the engagement of a portion of the car 24, and the closing of which contacts results in the sounding of an electric horn $h$ also in circuit with the battery B. The horses may be trained so as to start forward at the ringing of the bell and to stop at the sounding of the horn.

By manipulating the levers 60, see Fig. 8, the conveyers may be raised or lowered bodily, since it is obvious that by the pawl and ratchet mechanism 61 and 59, the cables which support the conveyers and which have been already described, will be wound up or paid out.

The awning forms a shade which will permit the picker to work in comfort. Moreover, the picker is seated and there is not the strain of bending which accompanies the work of one who picks in the ordinary way. The picker moreover is relieved of the sack and has both hands free to pick. The result is that he can do more work and do it with less fatigue.

In order to fold the machine into the position shown in Fig. 2, the pins 17 which hold the arms 15 to the brackets 16, are removed and the wheels 14 and 14' are turned inwardly into the position shown in dotted lines in Fig. 2. Now, by driving forwardly, the frame will tend to collapse or fold into the position shown in Fig. 2. In order to extend the frame it is only necessary to turn the front portions of the rear wheels outwardly instead of inwardly and then to drive ahead, when the frame will be brought to the position shown in Fig. 1. The advantage in folding or collapsing the device is apparent, since it will of course take up much less room on the road, pass through gates which it could not otherwise pass through, and take up less space in turning around at the ends of the rows of cotton.

I am aware that changes might be made in this device without materially departing from the invention, and I consider as my own all such modifications as clearly fall within the scope of the claims.

I claim:—

1. In a cotton harvesting device, a frame, a plurality of conveyers carried by said frame, said conveyers being adapted to enter between the rows of cotton plants, a movable seat carried by each conveyer, a receptacle at one end of the conveyer for receiving cotton, and means carried by the seat and adapted to engage a portion of the conveyer for operating the latter.

2. In a cotton harvesting device, a frame, a plurality of conveyers carried by said frame, said conveyers being adapted to enter between the rows of cotton plants, a track carried by each conveyer, a movable seat slidably supported on said track and arranged to move therealong, means carried by said seat and arranged to engage a portion of the conveyer for operating the latter, and a receptacle at the end of the conveyer for receiving cotton.

3. In a cotton harvesting device, a frame, a plurality of conveyers carried by said frame, said conveyers being adapted to enter between the rows of cotton plants, a track carried by each conveyer, a seat slidable along the track, and means carried by the seat and adapted to engage a portion of the conveyer for operating the latter when the seat is moving in one direction, the movement of the seat in the other direction being independent of the conveyer.

4. In a cotton harvesting device, a frame, a plurality of conveyers carried by said frame, each of said conveyers having an endless belt provided with cleats and said conveyers being adapted to enter between the rows of cotton plants, a movable seat carried by each conveyer, and a pawl pivotally connected to the seat and arranged to engage the cleats on said endless belt for moving the latter when the seat is moved in one direction, the movement of the seat in the other direction causing the pawl to ride idly over the seat.

5. In a cotton harvesting device, a frame, a plurality of conveyers suspended from said frame, said conveyers being adapted to enter between the rows of cotton plants, a track carried by each conveyer, a seat slidably disposed on said track and having an opening therein, an endless belt carried by each conveyer, cleats carried by said endless belt, and a pawl carried by said seat for engaging said cleats to move the endless belt when the seat is moved relatively to the frame.

6. In a cotton harvesting device, a frame, a plurality of conveyers carried by said frame, said conveyers being adapted to enter between the rows of cotton plants, the rear ends of each of said conveyers being inclined upwardly, a support secured to each of said conveyers at the rear end thereof, a receptacle disposed upon said support beneath the upper inclined end of the conveyer, a track carried by each conveyer, a seat arranged to slide on said track, an endless belt carried by the conveyer, cleats on said endless belt, and a pawl carried by the seat and arranged to engage the cleats for moving the endless belt in one direction.

7. In a cotton harvesting device, a frame, a plurality of conveyers carried by said frame, said conveyers being adapted to enter between the rows of cotton plants, a seat slidably disposed on each conveyer, means connecting said seat with the movable part of the conveyer for operating the latter when the seat is moved in one direction, and means for placing the seat under tension and for moving it in the opposite direction.

8. In a cotton harvesting device, a foldable frame, a plurality of conveyers carried by said foldable frame, said conveyers being spaced apart to enter between the rows of cotton plants, and individual means for operating each of said conveyers.

9. In a cotton harvester, a foldable frame, a plurality of conveyers carried by said frame, means for simultaneously raising or lowering said conveyers, a slidable seat carried by each conveyer, and means carried by the seat and arranged to engage a portion of the conveyer for operating the latter.

10. In a cotton harvesting device, a foldable frame, a plurality of conveyers carried by said foldable frame, said conveyers being spaced apart to enter between the rows of cotton plants, individual means for operating each conveyer, said means comprising a slidable seat carried by the conveyer, and means carried by the seat and arranged to engage a portion of the conveyer for operating the latter.

ERNEST PATRICK CAYO.

Witnesses:
 A. B. Cox,
 E. A. Cayo.